United States Patent
Dossas et al.

(10) Patent No.: US 8,903,371 B2
(45) Date of Patent: Dec. 2, 2014

(54) CELLULAR TELEPHONE SYSTEM AND METHOD

(71) Applicants: Vasilios Dossas, Chicago, IL (US);
Clifford H. Kraft, Naperville, IL (US);
Luiz Valdetaro, Coppell, TX (US)

(72) Inventors: Vasilios Dossas, Chicago, IL (US);
Clifford H. Kraft, Naperville, IL (US);
Luiz Valdetaro, Coppell, TX (US)

( * ) Notice: Subject to any disclaimer, the term of this patent is extended or adjusted under 35 U.S.C. 154(b) by 0 days.

(21) Appl. No.: 14/182,643

(22) Filed: Feb. 18, 2014

(65) Prior Publication Data

US 2014/0274024 A1 Sep. 18, 2014

Related U.S. Application Data

(63) Continuation-in-part of application No. 13/167,608, filed on Jun. 23, 2011, now Pat. No. 8,655,328.

(51) Int. Cl.
*H04M 3/00* (2006.01)
*H04W 8/24* (2009.01)
*G06F 11/14* (2006.01)

(52) U.S. Cl.
CPC ............ *H04W 8/24* (2013.01); *G06F 11/1464* (2013.01)
USPC ............ 455/418; 455/419; 455/420; 370/495

(58) Field of Classification Search
None
See application file for complete search history.

(56) References Cited

U.S. PATENT DOCUMENTS

| | | | |
|---|---|---|---|
| 7,865,181 B1 | 1/2011 | Macaluso | |
| 7,865,506 B1 | 1/2011 | Pedersen | |
| 7,869,824 B2 | 1/2011 | Min | |
| 7,881,709 B2 | 2/2011 | Wakasa et al. | |
| 2005/0014489 A1 | 1/2005 | Zhigang | 455/414.2 |
| 2008/0248834 A1* | 10/2008 | Chatterjee et al. | 455/557 |
| 2009/0064279 A1 | 3/2009 | Ardolino | 726/3 |
| 2014/0149521 A1* | 5/2014 | Broz et al. | 709/206 |

* cited by examiner

*Primary Examiner* — Suhail Khan
(74) *Attorney, Agent, or Firm* — Clifford Kraft (57) ABSTRACT

A cellular telephone system that includes a wireless handset that connects to a stationary (or mobile) data center, data station or home station remote from the wireless handset. The wireless handset and stationary data center communicate bi-directionally over an exclusive communication link such that commands entered by a user to the wireless handset are relayed to the stationary data center via the exclusive data communication link, and results from executing the commands are relayed from the home station to the wireless handset also via the exclusive data communication link and displayed on said screen. The processor at the data center or home station accesses the Internet and sends screens back to the handset for display. The handset appears smart to the user, but according to the present invention, most of the actual processing and Internet access is performed at the home station.

6 Claims, 6 Drawing Sheets

CELLULAR TELEPHONE SYSTEM AND METHOD

BACKGROUND

1. Field of the Invention

The present invention relates generally to the field of cellular telephones and more particularly to a cellular telephone system and method that includes a cellular telephone linked to a dedicated home station over an exclusive communications network.

2. Description of the Prior Art

The present invention relates to a cellular telephone system and method with smart application capability where settings, data and applications can be totally recovered if the phone is lost. A recent survey determined that a large percentage of cellular telephone users have experienced theft or loss of phones, either through theft, misplacement or destruction (such as dropping the phone into water). Prior art services exist to lock, erase, or backup private contact information on a cellular telephone if it is stolen, but they generally require a monthly charge. There are also devices and services to track a lost cellphone. Because much of the logic for smart applications (apps) is currently on the phone itself as well as almost complete contact data, there is no easy way to recover loaded applications or contact data if a phone is lost or destroyed. It would be advantageous to have a mobile phone that can act as though it were a smart phone, but is really directly tied to a home station (or synonymously a data center, home data center, data station or home data station) that stores and executes apps and saves data such as contact data (the home station may itself be mobile). If such a mobile phone were lost, only the basic shell is gone. All apps and personal data are on the home station. While there might be some risk to losing the home station in particular circumstances, the risk of losing a handset is much, much higher. Also, a home station can be backed up by methods well-known in the art.

Exclusive or dedicated communication between a local device and a mainframe or server has a long history. An early example is a mainframe receiving typewritten commands from a terminal or running a time-sharing service with hardwired terminals. The hardware necessary for such a system, including a central processing unit and memory, was connected to the terminal by an RS-232 interface link or other hardwire system, and the terminal was more like an I/O device than a computer. Today, Universal Serial Bus (USB) serves the function of connecting a device to a central computer, and, if the device is a terminal, a communications link can be added for remote connections to the mainframe or other central computer or system.

The terminal/mainframe setup is an early example of what today is called a client-server system, where the client makes execution requests to the server, or sends/receives data to or from the server. Typically, a client/server setup describes a network with several clients and one server. In particular, this was an early example of a thin client, one which had very little processing power.

A thin client typically contains only functionality for a GUI (graphical user interface) and communications, while a thick client typically is able to also execute applications or business logic; a hybrid client shares some processing power with the server. Other terminology used to describe thin clients is Remote Presentation, where the presentation is on the client, or Distributed Presentation, where the presentation is partly on client, partly on server.

Mobile phones can be part of a network generally as clients. A mobile phone that has only graphical user interface (GUI) functionality and little else, often lacking a complex operating system, has been called a dumbphone. Some of these dumbphones with low power and long battery life are being manufactured for developing countries where the emphasis is on simply being able to make a telephone call. Typically a dumbphone with some added-on hardware options, such as camera or GPS, has been called a feature phone. A feature phone normally has only a minimal development API (applications interface), but does often include software such as email, personal information management (PIM), and a web browser.

The majority of prior art dumbphones provide only the capability to make a basic cellular telephone call with little or no browser or application capability. Prior art dumbphones and thin-clients do not generally provide, and do not typically allow, the user to control any of the phone's capabilities except things related to phone calls such as ring tones and volume. Hence, the owner has no control over the apps (if any) or data used by apps on the phone.

It would be extremely advantageous to have a thin-client cellular telephone system that appears to be smart to a user, but in reality is tightly aligned with one particular home station. This telephone could be connected to that particular server under the owner's exclusive control via the cellular telephone network and/or the Internet using an exclusive communication channel such as a VPN or IPSec tunnel.

Macaluso in U.S. Pat. No. 7,865,181 teaches searching for mobile content, querying a computer system for data, and downloading it.

Pedersen in U.S. Pat. No. 7,865,506—teaches a method and system for fetching content from a server in a cellular communication system Byung Woo Min in U.S. Pat. No. 7,869,824—teaches a method of remote control of systems, for example in a home or vehicle, by a cellular telephone.

Wakasa, et al. in U.S. Pat. No. 7,881,709 teaches a system involving a controller that contributes to the execution of applications for a portable phone.

Remote access of one device into another has long been used to access applications such as email on a remote computer. What is badly needed is a system and method that will do more than just control applications on a remote computer or simply make telephone calls. It would be extremely advantageous to have a remote cellular telephone that could make telephone calls and that gives the user the appearance of having the functionality of a smartphone, but in reality, is tightly linked to a secure home station that contains the actual data, executes apps, browses the web and provides all the services and capabilities of a smart phone to the remote over an exclusive communication channel.

SUMMARY OF THE INVENTION

The present invention relates to a cellular telephone system that includes a wireless handset capable of wireless voice telephone calls that contains a processor, memory, screen, keys and a wireless data communications module that connects to a data center or home station remote from the wireless handset that also has a processor, a memory and a second wireless data communications module. The wireless handset and data center communicate bidirectionally over a private, exclusive communication link such that commands entered by a user to the wireless handset are relayed to the data center via the exclusive data communication link, and results from executing the commands are relayed from the data center to the wireless handset also via the exclusive data communication link and displayed on said screen. In some embodiments of the present invention, the exclusive communication link is a VPN or IPSec tunnel. The processor at the data center or home station accesses the Internet and sends screens back to the handset for display. The data center usually includes a browser executed on the second processor. The handset appears smart to the user, but, in reality, most of the actual processing and Internet access is performed at the data center or home station. In alternate embodiments of the present invention, the data center can be mobile.

DESCRIPTION OF THE DRAWINGS

Attention is directed to drawings that illustrate features of the present invention.

Several drawings and illustrations have been presented to aid in understanding the present invention. The scope of the present invention is not limited to what is shown in the figures.

DESCRIPTION OF THE INVENTION

The present invention relates to a system and method for a cellular telephone to give the appearance that it is a smartphone, while in reality, using a remote home station to perform necessary actions except local hardware control, screen control and communications. The handset can include a Graphical User Interface (GUI) and keypad capability (as well as optional hardware capability, such as a camera, music/video player, video recorder, FM radio, GPS, USB, or BLUETOOTH); however, it typically does not execute any apps. In the preferred embodiment, this handset does not contain a browser and has no web browsing capability except through the home station. Almost all functionality is supplied by a the home station at a safe location generally under the control of the user (located at the user's house for example). While in the preferred embodiment, the home station or data center is stationary, in alternate embodiments, it can also be mobile.

The handset of the present invention typically requires basic hardware and firmware capability such as memory, an MPU or CPU, a keypad or keyboard, power control, and can optionally contain capability for a touch system. It can also include low-level software with a small operating system or kernel executing one central application. This central application has the main purpose of requesting service of the home station, sending data to the home station, and displaying what is sent by the home station. An exclusive bidirectional communication link with the home station is generally required for any phone feature except the ability to make and receive a basic telephone call. Communication with the home station can be by VPN over the internet, WiFi or by any other method of achieving a dedicated, exclusive communication service. The communications can be set up so that handoffs can occur to different available secure services based on quality or signal strength. Security for data transfer can be provided by known techniques such as IPSec, SSL, https or any other secure technique. Any type of cryptographic technique or combination of cryptographic techniques is within the scope of the present invention. In an alternate embodiment, the handset might optionally contain an additional app for simple applications such as games; however, all major processing, especially web browsing, is handled by the home station.

The home station can be a PC, laptop, smartphone with some server capability, or a server that is typically owned by the user and can be located at a secure location. It can combine the functions of application and web server, and will contain apps as well as a framework of software to support them. Apps can typically include contact information/phonebook or PIM (personal information management), email, text messaging, voice over IP, web browsing, a main GUI, which might include Windows, Layouts, and other items in software libraries. The home station can also contain instances of data such as private contact information, or it can back up such information sent from the handset. The operating system on the home station can optionally include multiprocessing or multithreaded capabilities if it is desired to run several apps at once.

Smartphones typically allow the user to download new apps from the internet. The user of the present invention will be able to download such apps onto the home station in virtually the same manner; however, execution of those apps occurs on the home station, not on the handset.

Many times libraries are required to support the apps on the home station, the one central application on the handset, and the communications interaction between the home station and the handset. Almost all of those libraries are stored on the home station; however, particular copies of particular libraries can be downloaded to the handset to be used during a particular session to increase efficiency. For example, if character fonts were always rendered on the home station, bit images or changes to bit images would have to be sent over the communications link, which could be very inefficient. Low level libraries or files such as this can be cached on the handset. None of these libraries whose image might appear on the handset should contain any information useful to a thief or that cannot be safely lost or destroyed.

Depending on the complexity of the GUI, one could have 2D or 3D graphics libraries as well as a web page renderer. Other libraries whose image is possibly needed include some support for programming languages and databases, a file system and other basic OS and networking functions. A private communications app can run independently on the handset to control the exclusive communications link from the phone's end.

The home station also typically handles web browser execution that is normally done by a client, so with respect to the internet, it can act as a client, though it can also execute server-side internet applications. Users of the handset however, will think they are running a web browser on the handset, but it will only be a simulation on a GUI using downloaded images. If communications efficiency drops, or the handset is in a location where bandwidth with the home station is a problem, the handset can in some embodiments of the invention be modified to handle a few client-side web services, again by transferring cached images, or the internet could be used by the handset in an emergency only for data transfer without a GUI for the user. Also, differences (differential transmission) between images, frames or pages can be transmitted for compression. In some embodiments of the present invention, the handset can contain a browser with Apps and data generally being stored at the home station.

Figure 1A:
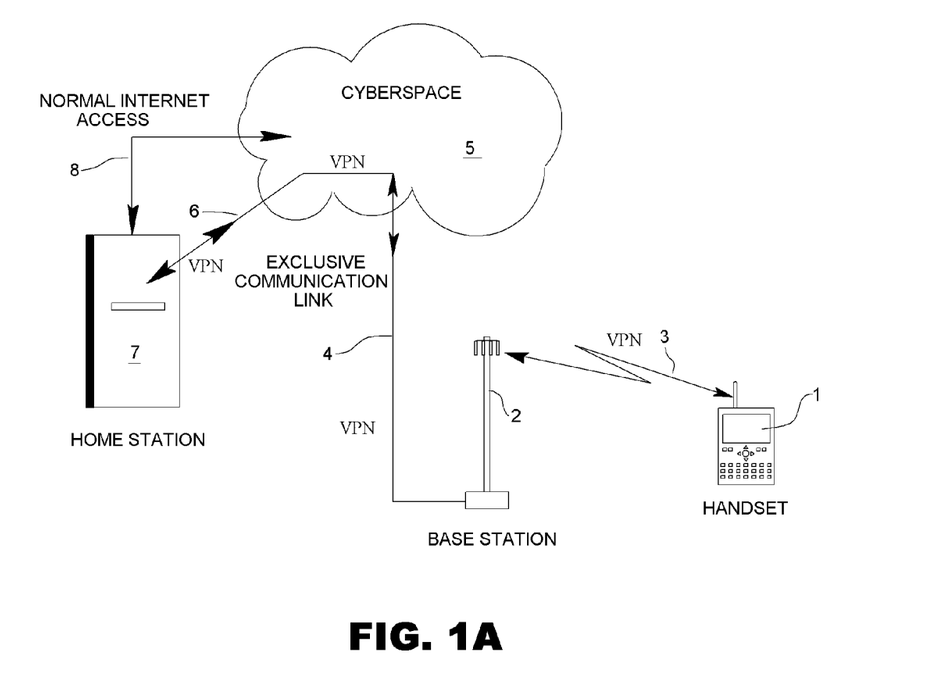
FIG. 1a is a system diagram of an embodiment of the present invention.

Turning to FIG. 1, a block diagram of an embodiment of the present invention can be seen. A home station 7 interfaces with one or more mobile handsets 1 using a private, exclusive communication link 6. The handset(s) communicate bidirectionally wirelessly with a cellular base station, the public switched telephone network (PSTN) and/or a private network or any other network. The public network allows the handset to place normal telephone voice calls. In addition, an exclusive private bidirectional communications link is set up between the handset and the home station. In FIG. 1, this is shown as a virtual private network (VPN) through the internet. However, there are numerous other ways that an exclusive private communication link can be set up. In an alternate embodiment, a private leased line can be used having a private telephone number or access code. The wireless handset can access this private leased line through the cellular network. The wireless part of the link can be in the form of WiFi known in the art, or any other wireless technique. Any method or technique for establishing and maintaining a private bidirectional communications channel between two or more stations is within the scope of the present invention.

In FIG. 1*a*, the home station, which can be a PC, laptop, smart-phone or server known in the art (or any other processing device), accesses the Internet 8 in any known manner including Ethernet to a DSL or DOCSIS modem connected to a telephone line or to a provider's coaxial cable; wireless access including WiFi and cellular telephone 3G or 4G, or any other internet access.

In addition to the standard Internet access, the home station communicates with the handset over a private exclusive communication link 6, 4. Typically, this exclusive link has two parts: 1) communication into the Internet 6, 2) communication 4 from the Internet into a cellular network, and 3) wireless communication 3 within the cellular network. Wireless communication 3 in the cellular network also typically includes standard voice calls and voice call features. FIG. 1 shows a handset 1 in wireless communication 3 with a base station 2. A VPN segment 4 using the PSTN from the base station 2 into cyberspace 5 (which is typically the Internet), another VPN segment 6 out of cyberspace 5 and into the data station 7. It should be understood that the home station's normal access 8 to cyberspace and the VPN segment 6 is typically on the same physical ports. Logically, the VPN is part of a secure tunnel that shares packets with normal packet traffic.

Figure 1B:
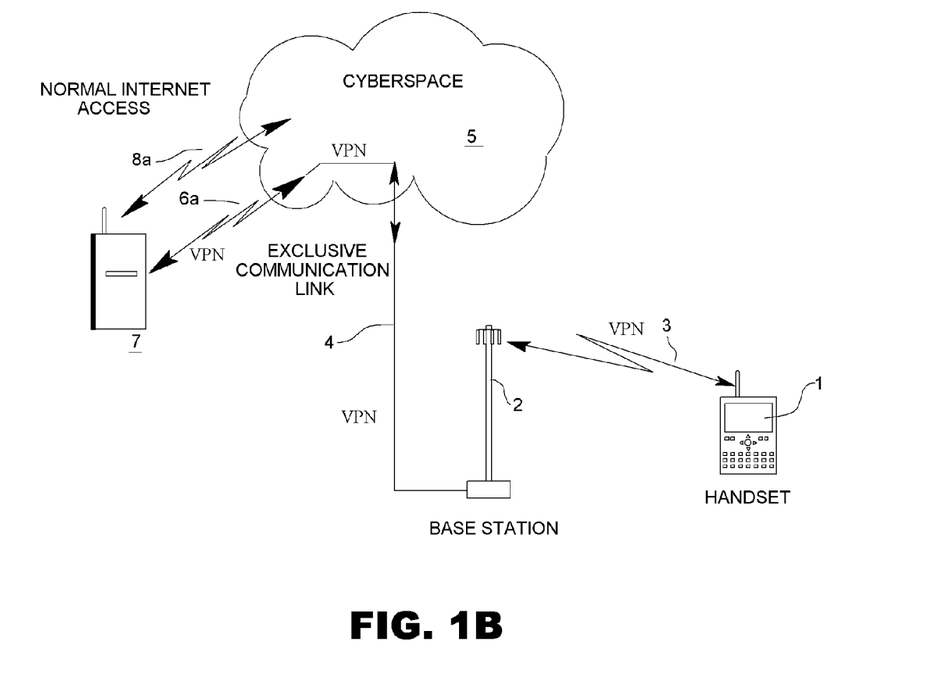
FIG. 1b is similar to the embodiment of FIG. 1a except the data station is mobile.

FIG. 1*b* shows an embodiment of the present invention with a mobile data station 7 using a wireless link from the home station 6*a* to the VPN and a wireless link to the normal internet 8*a*.

Figure 2:
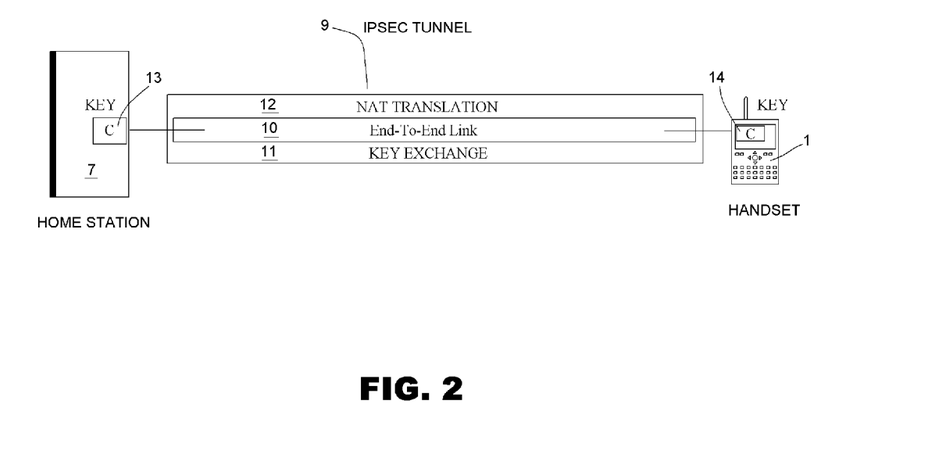
FIG. 2 shows details of a possible exclusive communications link.

FIG. 2 shows details of a particular embodiment of a private exclusive network between the home station 7 and a handset 1. The two ends connect through a IPSec tunnel 9 known in the art where a secure end-to-end link 10 is made. The IPSec tunnel uses known methods of key exchange 11, hashing, encryption, keys and Network Address Translation (NAT) 12 through various devices, typically using techniques described in various standards known in the art. One embodiment of these techniques is known as a virtual private network (VPN).

When the handset of the present invention is powered-up, a communications module 14 in the handset typically attempts to set up a VPN with a similar communications module 13 in one designated and allowed home station 7. For security reasons, usually only one home station is designated; however, more stations may be allowed as back-ups, alternates or in multiplex. Any number of home stations simultaneously or sequentially in communication with a single handset or multiple handsets is within the scope of the present invention. Also, any number of handsets 1 can be in simultaneous or sequential communication with a single home station. In some embodiments, multiple handsets may simultaneously or sequentially access multiple home stations; however, the preferred mode of operation includes one handset in communication with a unique single home station.

The VPN or other exclusive network is set up by using a protocol of exchanged messages. These messages usually perform a key exchange, navigation of NAT, and the formation of a IPSec tunnel. While IPSec is the preferred private communications technique, any other private, secure method is within the scope of the present invention. Security and encryption can follow IPSec, SSL, https or any other security technique.

Figure 3:
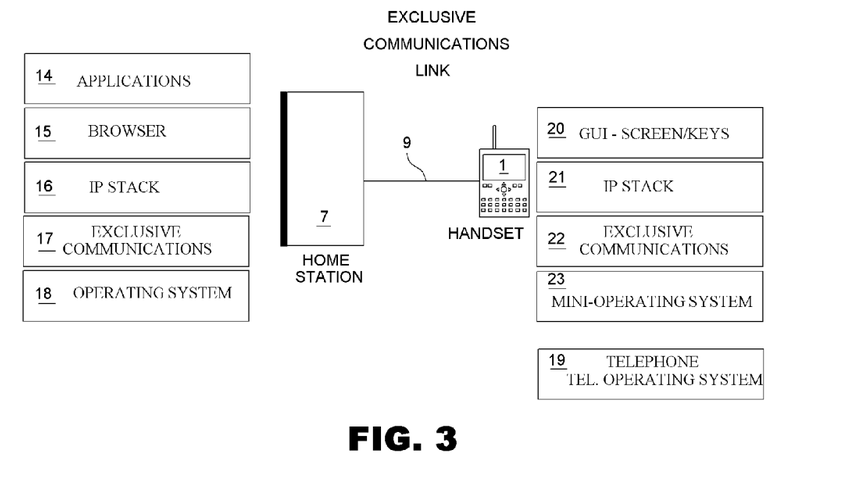
FIG. 3 shows program hierarchies for a home station and a handset according to the present invention.

FIG. 3 shows software maps of the home station 7 and the handset 1. At the lowest level on each side is an operating system 18, 23. The operating system 18 in the home station 7 is typical Microsoft Windows, MacOS, Unix, Linix or any other general operating system. The operating system in the handset 1 can be Android-based, iPhone-based, or otherwise, including Palm OS (and newer webOS), BlackBerry, Windows mobile or Windows Phone 7, Symbian, Android, Bada, and iPhone OS (IOS). Any operating system may be used and is within the scope of the present invention. In particular, the operating system in the telephone may be a special purpose operating system specially designed for the task.

At the next level on each side is an exclusive communications suite 17, 22 that establishes and maintains an exclusive private and permanent (at least as long as both sides are powered-up and can maintain it) communication link 9 previously described. This exclusive link usually works through the IP stack 16, 21 on both sides in a known manner such as for a VPN. However, the communication suites 17, 22 do not have to operate through the standard IP stacks 16, 21, but could be designed to bypass them. In a preferred mode, the VPN is established through the standard stacks using UDT into IP into IPSec as is known in the art.

At the next level on the handset is an application that operates the graphical user interface (GUI) 20 which is usually the screen and keys. The screen can be static or touch or both. The keys can be either real, virtual or both. The GUI layer 20 on the handset is typically, but not essentially, the only layer that runs on the handset. Usually, the user has no control over this layer, and this layer cannot be hacked. The purpose of the GUI layer 20 is to take entered commands and format them for the home station and to take screens from the home station and display them. The GUI 20 can also be used in most embodiments of the present invention to initiate or receive a cellular telephone voice call.

At the home station 7, the next layer is usually a standard browser 15. However, this browser is commanded from the handset 1 by commands transmitted over the exclusive communications link 9. Output from this browser 15 in the form of screens (which can be compressed for transmission), is sent over the exclusive communications link 9 to be displayed by the GUI 20 on the handset 1.

The top layer at the home station 7 is a standard application layer 14 where any App can be run. On the handset 1 side, there is normally no application layer (all Apps execute at the home station). There is however a cellular telephone layer 19 with an MPU and cellular telephone hardware and software. This can be located entirely on separate hardware devices (chip-sets) or can be co-located on a single CPU or other processor.

Figure 4:
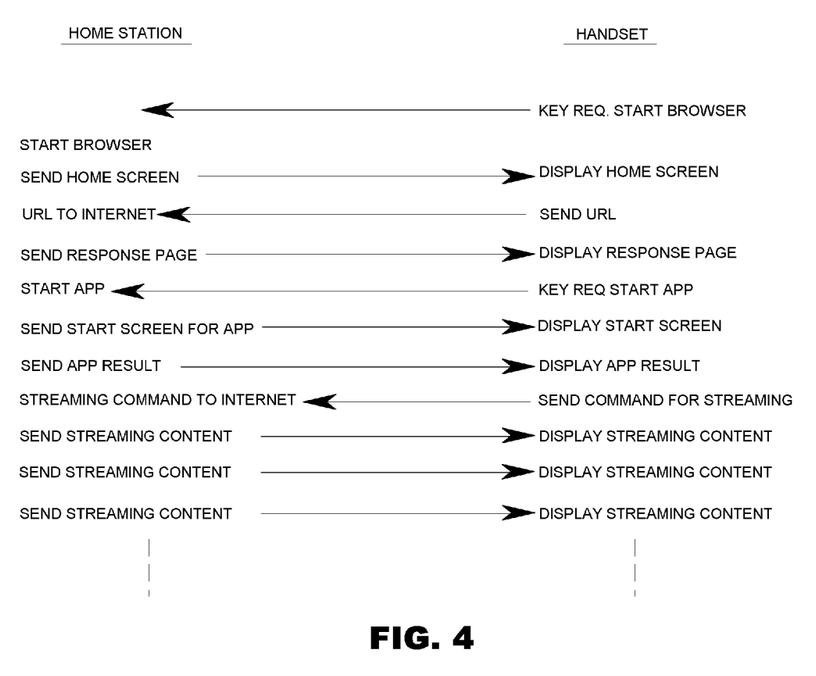
FIG. 4 shows a possible communication sequence between a handset and a home station.

FIG. 4 shows a possible example command sequence between a handset and a home station. The handset user touches an icon to start a browser. This command is sent to the home station which starts its main browser (or another instance of a browser). The home station browser returns a start-up page or home screen to the handset where it is displayed on the handset screen by the GUI. The user then selects a link or otherwise sends a URL to the browser. The browser at the home station receives this URL and performs all the known browser tasks to access a particular page. This page (in screen-display form, possibly compressed) is then sent to the handset where the GUI displays it. All interaction with the browser is via the exclusive communications link, and all browser tasks are performed by the browser at the home station.

Continuing in FIG. 4, the user next requests execution of an App. The command to start the App is transmitted over the exclusive communication link, and the home station starts the App. Any screens to be displayed by the App are returned over the exclusive communications link to the handset where they are displayed by the GUI. In FIG. 4, an App result is shown transmitted from the home station to the handset.

Finally, in FIG. 4, the user requests streaming (of video, audio, VoIP, etc.). The correct commands are transmitted to the browser in the home station which sets up the streaming operation typically by starting a streaming App. The streaming App caches buffers and supplies stream as a continuous packet flow to the handset through the exclusive communications link. The GUI on the handset then updates the screen and provides audio during the streaming operation.

The bandwidth of the exclusive communication link must be sufficient to support the most bandwidth-intensive application that will be run. Usually this involves the transfer of video streaming. In alternative embodiments of the present invention, the exclusive communication link can either use or switch to real-time packet preserving techniques known in the art of voice over IP (VoIP). Any method of preserving real-time relationships and/or providing sufficient bandwidth is within the scope of the present invention.

While the preferred embodiment of the present invention is to not permit the handset to execute any applications other than the local GUI and communications management, it is within the scope of the present invention to allow the handset to also be a smart-phone, tablet, iPhone™, iPad™, or to have independent ability to execute Apps. This is particularly useful if it is desired to use the techniques of the present invention on any platform. The specialized GUI and communication modules, while preferably supplied integral parts of the handset, can also be programmed as Apps under a programming platform such as Android™, iPhone™ or other platforms. Any type of mobile device may be used as the handset in the present invention.

In an alternate embodiment of the present invention, there can be more than one exclusive communication link between the remote handset and the home station, bi-directional or mono-directional. Various of these possible communication links can use different protocols, encryptions and the like. The use of more than one exclusive communication link provides extra reliability and can be used to provide extra security (by for example, sending some packets on one link and other packets on a second link). The home station can also optionally use other exclusive or dedicated links for various purposes such as other VPNs or other types of secure or protected communication.

Because households do not have a fixed IP address on a wide-area network like the Internet, and cannot host servers behind a completely closed firewall (ISP's normally close all ports on individual accounts), fixed IP addresses usually imply expensive business accounts and networking knowledge not available to common households. An alternate embodiment of the present invention solves this problem.

Figure 5:
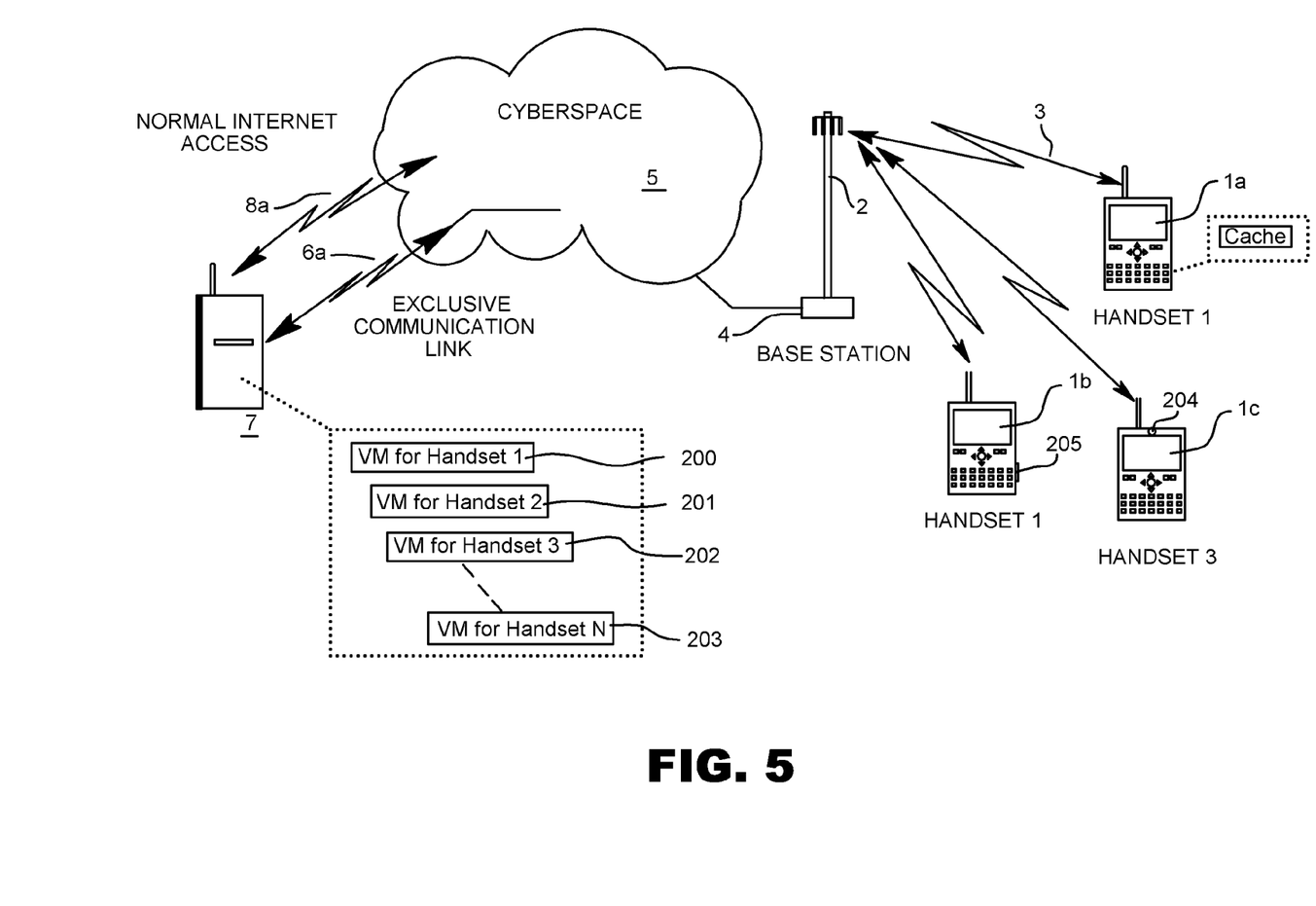
FIG. 5 shows an alternate embodiment of the present invention.

The telephone handset with the capabilities previously described will be called a "dumb phone" for purposes of the alternate embodiment. FIG. 5 shows the alternate embodiment.

In an alternate embodiment, the server 7 can be a host server hosting several virtual machines (VM) 200, 201, 202, 203 each of which is a virtual phone in an optional window communicating over the secure network with a real physical mobile telephone. This virtual phone can conduct all communications with the Internet or other network, but also using Voice Over Internet Protocol (VOIP) it can optionally route all voice telephone calls from the mobile telephone via the Internet to the telephone company's servers (not shown). There are thus a plurality of virtual phones serving a plurality of physical dumb phones. Each physical dumb phone can connected to one virtual phone running under a virtual machine on the real server 7. While the preferred embodiment has a one-to-one correspondence between virtual phones running on virtual machines and physical telephones, this is not a requirement of the present invention. It is also possible for single virtual machine to service more than one physical mobile telephone.

In this embodiment, there can be special software in the dumb phones that communicates with the virtual phones to handle upstream and downstream audio for phone conversations as well as streaming audio. There can be an ability on the dumb phone to cache 206 entire Apps. and/or content for those times that the Internet is not available. For example, these Apps. may include reading e-books, viewing movies, viewing contact information, and the like.

There can be special software that can upstream video from the dumb phone to the virtual phone so the camera on the dumb phone can be used to record movies and take pictures that are actually stored on the virtual phone. There can also be software on the virtual phone that can receive such content and store it.

There can be software on both the virtual phone and the dumb phone that enables attachments to the dumb phone such as credit card readers, blood analyzers, and the like, and which upstreams that content from the dumb phone to the virtual phone.

The advantages of the alternate embodiment of the present invention are several: First, the household controls a multitude of phones from one server. Also a business can have a massive server and control all of it's employee's phones and content. Second, the phone no longer requires a "voice" mobile connection, and all phone connections can optionally be via VOIP which can reduce phone charges. Third, even when the internet is not available (in an airplane for example) the end user can still run some apps. Fourth, the Dumb Phone can be used to capture photos and videos. Fifth, the dumb phone can be used with attachments that typically could only be used with smartphones.

In FIG. 5, the server 7 contains software that can run N virtual machines 200, 201, 202, 203, where N is a positive integer. Each virtual server interfaces to a real handset 1a, 1b, 1c, where each handset is a dumb phone. A camera 204 on one of the dumb phones 1c can send photos to its virtual machine as described above. Some physical dumb phones have attachment ports 205 for standard telephone attachments.

Several descriptions and illustrations have been provided to help understand the present invention. One with skill in the art will realize that numerous changes and variations are possible without departing from the spirit of the invention. Each of these changes and variations is within the scope of the present invention.

We claim:

1. A system for private and independent control of a plurality of mobile telephones comprising:
a fixed server with wide-area network access configured to execute stored instructions that implement a plurality of virtual machines;
a plurality of mobile telephones, each in secure communications over said wide-area network with one of said plurality of virtual machines in the fixed server;
wherein, said server is configured to provide voice over internet protocol (VOIP) service for voice telephone calls between said mobile telephones and locations remote from said server, and
wherein said server is also configured to allow non-secure data access to said wide-area network to each of said virtual machines so that browsers executing in said virtual machines can provide browsing capability to at least some of said mobile telephones.

2. The system of claim 1 wherein there is one-to-one correspondence between said virtual machines and said mobile telephones.

3. The system of claim 1 further comprising executable instructions on said server in at least some of said virtual machines at least some of said mobile telephones that allow transfer of image data from a mobile telephone to a virtual machine or from a virtual machine to a mobile telephone.

4. The system of claim 3 wherein said image data originates from a camera on a mobile telephone.

5. The system of claim 1 wherein at least some of said mobile telephones are adapted to cache content or applications transmitted securely from one of said virtual machines.

6. The system of claim 1 wherein at least some of said mobile telephones are adapted to attach to phone attachments including blood pressure analyzers and credit card readers.

* * * * *